United States Patent
Drewniak et al.

(12) 
(10) Patent No.: US 6,465,571 B1
(45) Date of Patent: Oct. 15, 2002

(54) ENGINEERED POLYOLEFIN MATERIALS WITH ENHANCED PROPERTIES

(75) Inventors: Marta Drewniak, Carrollton, TX (US); Jhy-Yuan Her, Euless, TX (US); Satchit Srinivasan, Carrollton, TX (US); Edward Szczepaniak, Arlington, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 0 days.

(21) Appl. No.: 09/562,956

(22) Filed: May 3, 2000

(51) Int. Cl.[7] ................................. C08F 255/00
(52) U.S. Cl. ..................... 525/71; 524/504; 524/505
(58) Field of Search ........................ 525/71; 524/504, 524/505

(56) References Cited

U.S. PATENT DOCUMENTS

| | | | |
|---|---|---|---|
| 4,945,005 A | | 7/1990 | Aleckner, Jr. et al. ...... 428/500 |
| 4,946,896 A | | 8/1990 | Mitsuno et al. ................ 525/93 |
| 4,950,541 A | | 8/1990 | Tabor et al. ................. 428/373 |
| 5,286,791 A | * | 2/1994 | DeNicola, Jr. et al. ........ 525/71 |
| 5,324,755 A | * | 6/1994 | Kilius et al. ................. 523/214 |
| 5,331,046 A | * | 7/1994 | Chang et al. .................. 525/71 |
| 5,571,581 A | * | 11/1996 | Koizumi et al. ............... 428/31 |
| 5,783,629 A | * | 7/1998 | Srinivasan et al. ............ 525/71 |
| 5,883,188 A | | 3/1999 | Hwang et al. ................. 525/71 |
| 6,140,425 A | * | 10/2000 | DeNicola, Jr. et al. ...... 525/293 |
| 6,177,515 B1 | * | 1/2001 | Smith et al. ................... 525/70 |

FOREIGN PATENT DOCUMENTS

| | | |
|---|---|---|
| EP | 0 794 225 | 9/1997 |
| EP | 0796894 | * 9/1997 |
| EP | 936230 | 10/1997 |
| EP | 0 831 125 | 3/1998 |
| JP | 10 219040 | 8/1998 |
| WO | WO 97/38050 | 10/1997 |

OTHER PUBLICATIONS

Kiyoo Kato et al., "New Developments in Styrenic Block Copolymers (SEBS) for Polypropylene Modification", Fifth International Conference, "TPO's in Automotive 98", Oct. 12–14, 1998, Novi, Michigan.

* cited by examiner

Primary Examiner—Jeffrey Mullis
(74) Attorney, Agent, or Firm—Winston & Strawn

(57) ABSTRACT

A polyolefin blend is presented having a propylene containing polymer as a base component, a portion of which is functionalized with a hydrophilic moiety; a toughening component of polymer selected from the group consisting of (A) a copolymer of ethylene and an alpha olefin and (B) a terpolymer of ethylene, an alpha olefin and a diene; an interfacial modifier in the form of an elastomeric block copolymer; and a filler. The functionalized portion of the propylene containing polymer is present in an amount sufficient to ensure dispersion of the filler within the semi-cystalline portion of the blend; the toughening agent is present in an amount sufficient to enhance low temperature impact properties of the blend but less than about 40 weight percent, the interfacial modifier is present in an amount sufficient to assist in adhesion between the polymer components of the blend but less than about 30 weight percent, and the filler is present in an amount sufficient to enhance blend strength and hardness but less than about 40 weight percent. Also included is an article of manufacture containing the polyolefin blend described and a method for making such an article of manufacture by molding the described polyolefin lend into the configuration and shape of the article of manufacture, and the use of such articles as automobile components.

22 Claims, No Drawings

US 6,465,571 B1

ENGINEERED POLYOLEFIN MATERIALS WITH ENHANCED PROPERTIES

FIELD OF THE INVENTION

The invention relates to polyolefin blends which have superior physical properties including enhanced toughness at high reinforcement levels for high performance use in molded articles such as automotive vehicle bumpers or the like. The invention also relates to molded articles as well as to methods for producing them.

BACKGROUND ART

In numerous applications, such as many in the automotive industry, a polymeric material that exhibits a good balance of toughness and rigidity is desired. These properties tend to occur inversely however, and efforts to enhance one will often result in deterioration in the other. Special polymeric materials have been developed that overcome this problem to some degree.

European Patent Application 0794225-A1 discloses thermoplastic resin compositions comprising polypropylene, a styrene containing elastomer and talc wherein an acceptable balance of toughness and rigidity is reported. The disclosure stresses the importance of the proportions of each component used to achieve this balance.

In PCT Application WO97/38050, a similar balance of properties is reported for a thermoplastic resin comprising an ethylene-propylene based polymer composition, an ethylene-alpha olefin copolymer based rubber and/or a rubber containing vinyl aromatic compounds and talc. Another example of a composition with an acceptable balance of toughness and rigidity is reported in Japanese Patent Application 10-219040-A for a resin composition consisting of a polyolefin based resin and a block copolymer based on aromatic vinyl and butadiene monomer units.

A comparative study of mechanical properties of compositions like those disclosed in the foregoing references is reported in Kiyoo Kato et al. *New Developments in Styrenic Block Copolymers (SEBS) for Polypropylene Modification*, Fifth International Conference, "TPO's in Automotive '98", Oct. 12–14, 1998, Novi, Mich. There is confirmation therein that a good balance of toughness and rigidity is exhibited by such compositions. Kato and his colleagues also report results from a related morphological study in this same paper, and it can be concluded from these results that the styrene based components in these compositions promote toughness at least by segregating at the interface of the other components and entangling with polymer chains in the various phases.

Despite these prior art formulations, there remains a need to obtain other polymeric materials with a good balance of toughness and rigidity, and the present materials satisfy this need.

SUMMARY OF THE INVENTION

The present invention relates to polyolefin blends comprising a base component of a propylene containing polymer, a portion of which is functionalized with a hydrophilic moiety; a toughening component of polymer selected from the group consisting of (A) a copolymer of ethylene and an alpha olefin and (B) a terpolymer of ethylene, an alpha olefin and a diene; an interfacial modifier in the form of an elastomeric block copolymer; and a filler. In these blends, the functionalized polypropylene is present in an amount sufficient to ensure dispersion of the filler with the semicrystalline portion of the blend. This permits a higher weight fraction of the filler within the polypropylene phase, leading to superior reinforcement. The toughening agent is present in an amount sufficient to enhance low temperature impact properties of the blend, the interfacial modifier is present in an amount sufficient to assist in adhesion between the polymer components of the blend, and the filler is present in an amount sufficient to enhance blend strength and hardness.

Another aspect of the present invention is a method for making an article of manufacture comprising the step of molding the described polyolefin blend into a desired configuration and shape of the article of manufacture. The resultant molded articles and their use as automotive components are further aspects of the invention.

DETAILED DESCRIPTION OF THE PREFERRED EMBODIMENTS

The present invention relates to polymer blends of engineered polyolefin based materials that include various preferred combinations of: (1) a base component of polypropylene or a copolymer of propylene and another alpha olefin; (2) a component of propylene containing polymer that is functionalized with hydrophilic monomer(s); (3) a toughening component of (A) a copolymer of ethylene and another alpha olefin or (B) a terpolymer of ethylene, another alpha olefin and a diene; (4) an interfacial modifier in the form of an elastomeric block copolymer; and (5) a treated or untreated mineral filler. These blends surprisingly exhibit high balanced levels of toughness and rigidity previously unobtainable in the art.

It has also been found that the polyolefin materials of the present invention have, at the same time, unexpectedly high dimensional stability, hardness (and therefore scratch resistance) and good paintability, while still possessing a good melt flow rate. All these properties are obtained at significantly higher reinforcement levels than other polyolefin materials with similar toughness. This overall combination of properties is desirable for parts or molded articles used in many industries, notably, the automotive.

The component usually in the largest proportion in the polyolefin based composition of the present invention is the base component of the propylene containing polymer. This polymer is preferably a homopolymer of propylene or a copolymer of propylene and another alpha olefin. This material is most often characterizable as semi-crystalline in compositions according to the present invention. "Semi-crystalline" means that the crystallinity is at least 30% and preferably is 50% or greater.

Suitable types of homopolymers of propylene include highly isotactic polypropylenes. An acceptable copolymer of propylene is ethylene-propylene copolymer. It is preferred that this component make up at least about 33 to 75 weight percent of the overall composition, preferably 40 to 60 weight percent and more preferably 45 to 55 weight percent.

It is possible for a portion of the propylene containing polymer to be functionalized, such as by reaction of the propylene containing polymer with a compound that contains hydrophilic groups or moieties such as hydroxyl functionality. These compounds would be added in an amount sufficient to functionalize between about 0.5 and 50% of the propylene containing polymer, preferably between about 5 and 40% and most preferably between about 8 and 30%. Such reaction may be carried out in situ during extrusion. It is preferred, however, to add the functionalized propylene containing polymer as a separate component. Functionalized polypropylene makes up about 1 to 20 weight percent of the overall composition, preferably 3 to 15 weight percent and more preferably 5 to 13 weight percent.

Suitable hydrophilic monomers for use in functionalization include organic compounds that contain one or more hydroxyl groups and anhydrides of carboxylic acids such as phthalic anhydride, maleic anhydride and itaconic anhydride. Other examples of suitable functionalizing compounds include vinyl chloride, silanes, acrylonitrile, styrene, styrene derivatives such as styrene co-hydroxypropylene, methacrylate, acrylic acid, acrylates, vinyl pyridine, vinyl acetates, alkyl or glycidyl methacrylates, 2-vinyl pyridine, methacrylic ester derivatives containing aromatic amines or phenols, citraconic anhydride, maleic anhydride-trimethylopropane ester, acrylamide, vinyl caprolactam and divinylbenzene. Combinations of functionalizing compounds can be used such as methacrylate/vinyl acetate mixtures or acrylic acid/methacrylic acid mixtures. Preferably, maleic anhydride, acrylate or combinations thereof are used.

This functionalized propylene containing polymer enhances dispersion of the mineral filler in the composition, preferentially into the semi-crystalline portion of the blend, and increases interfacial interactions leading to surprisingly superior reinforcement without negatively affecting toughness. It is believed that this functionalized propylene containing polymer in combination with the other polymers in the overall composition permits good adhesion to the particles of mineral filler also present and thus, the unexpectedly superior level of toughness observed at high levels of reinforcement. Preferably, this component is semi-crystalline as defined above.

Also present in the polyolefin composition of the present invention is a toughening component of (A) a copolymer of ethylene and another alpha olefin or (B) a terpolymer of ethylene, another alpha olefin and a diene. This component adds toughening properties to the composition and contributes to the good impact resistance of the blends. Like many of the other components of the overall composition of the present invention, it is most often semi-crystalline as defined above.

Possible alpha olefins present in this component besides the ethylene already named include any $C_3$ to $C_{18}$ olefin, preferably a $C_3$ to $C_{10}$ olefin, with propylene, butene or octene being preferred and octene being most preferred. When dienes are used, any $C_4$ to $C_{18}$ alkene can be used. An example of a preferred diene for use in making terpolymers is ethylidene norbornene. It is preferred that this toughening component make up from about 1 to 25 weight percent of the overall composition, more preferably 5 to 25 weight percent, and even more preferably 10 to 20 weight percent.

When a terpolymer is used, the amount of diene in the terpolymer in not critical and values as low as 0.5% are useful. Typically, the diene content of the terpolymer will be from about 3 to 20%, and preferably from 7 to 15%.

Another component in the polyolefin based material of the present invention is an interfacial modifier. This is preferably a thermoplastic elastomer comprising a styrenic block copolymer. This component contributes to the compatibilizing effect of the filler with the other polymer components as well as significantly improving adhesion between the polymeric phases. This leads to the high toughness of the overall composition while improving rigidity.

Acceptable styrenic block copolymers include copolymers of styrene, ethylene and another alkene. Preferred copolymers contain blocks of styrene/(ethylene-butene)/styrene, styrene/ (ethylene-propylene)/styrene, styrene/(ethylene-butene), styrene/(ethylene-propylene), styrene/butene/styrene, styrene/butene, styrene/butadiene and styrene/isoprene. The preferred copolymers are those having at least three blocks or a pair of two repeating blocks. For example, repeating styrene/butadiene or styrene/(ethylene-propylene) blocks are desirable, with the most preferred copolymer being one made up of styrene/(ethylene-propylene)/styrene/(ethylene-propylene) blocks. It is also preferred that the styrenic block copolymer component make up from about 1 to 30 weight percent of the overall composition, more preferably 2 to 20 weight percent and even more preferably 3 to 18 weight percent.

There is also present in the polyolefin composition of the present invention a mineral filler. Higher levels of mineral filler are seen as allowing for increased stiffness and control of shrinkage, especially under the influence of the other components in the composition of the present invention.

The mineral filler can be a treated or untreated inorganic material. Preferred fillers include talc, calcium carbonate, wollastonite, alumina trihydrate, barium sulfate, calcium sulfate, carbon blacks, metal fibers, boron fibers, ceramic fibers, polymeric fibers, kaolin; glass, ceramic, carbon or polymeric microspheres; silica, mica, glass fiber, carbon fiber and clay with talc being most preferred. It is also preferred that the mineral filler be present in an amount of from about 1 to 30 weight percent of the overall composition more preferably 5 to 25 weight percent and most preferably 8 to 20 weight percent.

The polyolefin material of the present invention will preferably have an Izod impact strength at minus 30 degrees Celsius of at least 1 ft-lb/in, a flexural modulus of at least 175 kpsi, a melt flow rate of at least 15 dg/min at 230 degrees Celsius and 2.16 kg, and a peel strength of at least 700 N/m measured in 180 degree peel. More preferably, the material will have an Izod impact strength at minus 30 degrees Celsius of greater than 1.5 ft-lb/in, a flexural modulus greater than 190 kpsi, a melt flow rate of at least 20 dg/mil at 230 degrees Celsius and 2.16 kg, a Rockwell R hardness of at least 70, a shrinkage of no greater than about 8 mil/inch and a peel strength of at least about 900 N/m measured in 180 degree peel. These properties are those as measured according to the methods given in the examples to follow; such standards are to be taken as defining these properties when interpreting the claims. Such properties are understood at least to act as implicit recitations of composition when stated in the claims.

Given the good balance of toughness and rigidity in the materials of the present invention, as well as other excellent properties noted previously, this polyolefin material is suitable for many specialized applications. For example, this material can be shaped into components used in many interior and exterior automobile parts. Shaping as used herein could include molding and/or extruding, with the injection molding of a blend of the recited components being preferred. The resultant molded articles are highly useful for applications such as automobile door panels and bumpers.

The polyolefin based composition of the present invention may be prepared in one or two steps. In a two step method, components (1), (2) and (5) of the overall composition are melt blended and optionally along with stabilizers and/or additives using an extruder or other mixing equipment. The resulting masterblend is then melt blended with components (3) and (4) of the overall composition, and optionally along with stabilizers and/or additives; this second step can be performed using continuous or batch mixing equipment. Alternately, both of the steps in the two step method can be performed sequentially using a twin screw extruder effectively making for a one step approach. The following examples in Table I are illustrative of compositions of the present invention:

TABLE I

| Component/ | Examples | | | | |
|---|---|---|---|---|---|
| (wt % or physical property) | 1 | 2 | 3 | 4 | 5 |
| HIPP[1] | — | — | — | 53 | — |
| HIPP[2] | 46 | 46 | 46 | — | 43.5 |
| PP-MA[3] | — | 10 | — | 10 | — |
| PP-AA[4] | 10 | — | 10 | — | 9.5 |
| SEPSEP[5] | 11 | 11 | 17 | 11 | 13 |
| Poly(ethylene-co-octene)[6] | 17 | 17 | 11 | 17 | 19 |
| FILLER[7] | 16 | 16 | 16 | 9 | 15 |
| HARDNESS[8] | 70 | 73 | 71 | 79 | 76 |
| FLEXURAL MODULUS[9] | 238 | 258 | 219 | 259 | 192 |
| MFR[10] | 22 | 23 | 19 | 23 | 16 |
| DENSITY[11] | 1.00 | 1.00 | 1.01 | 0.96 | 0.99 |
| IMPACT @-30C[12] | D | D | D | D | D |
| DUCTILITY INDEX[13] | 0.38 | 0.39 | 0.35 | 0.40 | 0.31 |
| IZOD IMPACT TEST @-30C[14] | 2.09 | 1.67 | 2.15 | 1.48 | >5.31 |
| MOLD SHRINKAGE[15] | 7.0 | 7.5 | 8.0 | 9.2 | 8.0 |
| PEEL STRENGTH[16] | >1500 | 890 | 1150 | 1000 | 1130 |

Notes:
[1]HIPP — HIPP EOD 97-13 from Fina; highly isotactic polypropylene, MFR (at 230 C., 2.16 kg) = 70 dg/min, ASTM D-1238.
[2]HIPP — VB 35-125 from Amoco; highly isotactic polypropylene, MFR (at 230 C., 2.16 kg) = 125 dg/min, ASTM D-1238.
[3]PP-MA — Polybond 3150 from Uniroyal; polypropylene functionalized with maleic anhydrate (MA), MFR (at 230 C., 2.16 kg) = 50 dg/min, ASTM D-1238; MA concentration = 0.5%.
[4]PP-AA — Polybond 1002 from Uniroyal; polypropylene functionalized with acrylic acid (AA), MFR (at 230 C., 2.16 kg) = 20 dg/min, ASTM D-1238; AA concentration = 6%.
[5]SEPSEP — Kraton G-1730M from Shell; multi-block copolymer (styrene/ethylene-propylene/styrene/ethylene-propylene or SEPSEP); MFR (at 230 C., 2.16 kg) = 4.2 dg/min; styrene content = 23%.
[6]Poly(ethylene-co-octene) — Engage 8180 from Dow-DuPont Elastomers; C2 = 72%; MFR (at 190 C., 2.16 kg) = 0.5 dg/min, ASTM D-1238; molecular weight distribution = 2.
[7]FILLER — Ultra Talc 609 from Luzenac; particle size = 0.9 micron.
[8]Rockwell R HARDNESS measured according to ASTM D-785.
[9]kpsi measured according to ASTM D-790.
[10]dg/min at 230 C. and 2.16 kg as measured according to ASTM D-1238.
[11]g/cm$^3$.
[12]D = Ductile Failure; B = Brittle Failure measured according to ASTM D-3763.
[13]Ductility Index is measured by using the impact test according to ASTM 3763. It is calculated from the equation:
DI = (T-U)/T
where:
DI is Ductility Index
T represents total energy at the point at which the probe has broken through the specimen. That is, the point at which the force applied to the specimen by the probe drops to zero.
U represents ultimate energy. That is, the energy at the point at which the force exerted by the probe on the specimen is at maximum as determined from the force-position curve of force applied by the probe to the specimen versus the position of the probe.
The DI values for each of 3–5 specimens are averaged and reported as DI.
[14]ft-lb/in measured according to ASTM D-256.
[15]mils/inch. measured according to ASTM standard D-955.
[16]N/m measured in 180 degree peel.

The peel strength is the force (N/m) required to peel the paint off a substrate and is a measure of adhesive strength of the coating of the substrate.

In determining the peel strength, an injection molded plaque, formed from the composition in question of size 4×6 inches and ⅛ inch thick, is partially coated with adhesion promoter and entirely with the topcoat, both of the type used in the automotive industry for coating polyolefinic materials, to enable lifting the topcoat from that portion of the plaque which is not coated with the adhesion promoter.

Cuts through the topcoat coating are made using a sharp knife and a metal template to form two or three one cm wide strips. The one cm wide strips are slowly peeled from those portions of the plaque which are free of the adhesion promoter. A piece of polyester tape is placed on the peeled off strip to form a "handle" with which the strip is peeled further. The prepared plaque is placed into an Instron Model 1130 Tensile Tester.

The force required to peel the strip from the plaque is recorded as a function of the length of peeled off strip along the plaque. The peeling speed is two inches per minute. The average force in the entire peel is reported as the measure of adhesion strength per one cm of width of the peel. That is, in units N/m.

Comparative Examples A, B, and C of Table II below should be compared with Example 1 of the present invention as they are the same except that one different component is removed in A, B, and C as compared to Example 1. D and E represent prior art compositions not containing styrenic block copolymers.

TABLE II

| Component/ | Comparative Examples | | | Prior Art | |
|---|---|---|---|---|---|
| (wgt % or physical property) | A | B | C | D | E |
| HIPP[1] | 56 | 46 | 46 | 54 | 54 |
| PP-AA[2] | — | 10 | 10 | — | — |
| SEPSEP[3] | 11 | 28 | — | — | — |
| Poly(ethylene-co-octene)[4] | 17 | — | 28 | — | — |
| Poly(ethylene-co-octene)[5] | — | — | — | 10 | — |
| Poly(ethylene-co-butene)[6] | — | — | — | 20 | — |
| EPR[7] | — | — | — | — | 30 |
| FILLER[8] | 16 | 16 | 16 | 16 | 16 |
| HARDNESS[9] | 64 | 71 | 70 | 70 | 34 |
| FLEXURAL MODULUS[10] | 233 | 212 | 243 | 247 | 243 |
| MFR[11] | 25 | 22 | 16 | 27 | 19 |
| DENSITY[12] | 1.0 | 1.01 | 0.99 | 1.0 | 1.01 |
| IMPACT @-30C[13] | D | B | B | B | B |
| DUCTILITY INDEX[14] | 0.38 | 0.34 | 0.20 | 0.05 | 0.04 |
| IZOD IMPACT TEST @-30C[15] | 1.72 | 2.05 | 1.5 | 1.06 | 0.74 |
| MOLD SHRINKAGE[16] | 8.7 | 8.5 | 7.8 | 8.5 | 8.2 |
| PEEL STRENGTH[17] | 460 | 950 | 1170 | 300 | 180 |

Notes:
[1]HIPP — VB 35-125 from Amoco; highly isotactic polypropylene, MFR (at 230 C., 2.16 kg) = 125 dg/min, ASTM D-1238.
[2]PP-AA — Polybond 1002 from Uniroyal; polypropylene functionalized with acrylic acid (AA), MFR (at 230 C., 2.16 kg) = 20 dg/min, ASTM D-1238; AA concentration = 6%.
[3]SEPSEP — Kraton G-1730M from Shell; multi-block copolymer (styrene/ethylene-propylene/styrene/ethylene-propylene or SEPSEP); MFR (at 230 C., 2.16 kg) = 4.2 dg/min; styrene content = 23%.
[4]Poly(ethylene-co-octene) — Engage 8180 from Dow-DuPont Elastomers; C2 = 72%; MFR (at 190 C., 2.16 kg) = 0.5 dg/min, ASTM D-1238; molecular weight distribution = 2.
[5]Poly(ethylene-co-octene) — Engage 8200 from Dow-DuPont Elastomers; C2 = 76%; MFR (at 190 C., 2.16 kg) = 5.0 dg/min, ASTM D-1238; molecular weight distribution = 2.
[6]Poly(ethylene-co-butene) — Exact 4033 from Exxon Co.; produced using Kaminsky catalyst, and having C2 = 80%; MFR (at 190 C., 2.16 kg) = 0.8 dg/min, ASTM D-1238; molecular weight distribution = 2.
[7]EPR — Dutral CO-54 from Enichem; poly(ethylene-co-propylene); C2 = 50%, C3 = 50%, Mooney Viscosity at 100° C. = 35; molecular weight distribution = 4.6.
[8]FILLER — Ultra Talc 609 from Luzenac; particle size = 0.9 micron.
[9]Rockwell R HARDNESS measured according to ASTM D-785.
[10]kpsi measured according to ASTM D-790.
[11]dg/min at 230 C. and 2.16 kg as measured according to ASTM D-1238.
[12]g/cm$^3$.
[13]D = Ductile Failure; B = Brittle Failure measured according to ASTM D-3763.
[14]See note 13 following Table I.
[15]ft-lb/in measured according to ASTM D-256.
[16]mils/inch. measured according to ASTM standard D-955.
[17]See note 16 following Table I.

The above description and examples should not be taken so as to unnecessarily limit the scope of the invention.

What is claimed is:

1. A polyolefin blend comprising:
    a base component of a polypropylene containing polymer, a portion of which is functionalized by a hydrophilic moiety of an organic compound that contains one or more hydroxyl groups, an anhydride of a carboxylic acid, acrylamide, or combinations thereof;
    a toughening agent component of polymer comprising one or more of a copolymer of ethylene and an alpha olefin or a terpolymer of ethylene, along with an alpha olefin and a diene, wherein the alpha olefin comprises butene, octene, or both;
    an interfacial modifier in the form of an elastomeric block copolymer;
    a filler;
    wherein the functionalized portion of the propylene containing polymer is present in an amount sufficient to increase dispersion of the filler within a semicrystalline portion of the blend, the toughening agent is present in an amount sufficient to enhance low temperature impact properties of the blend but less than about 40 weight percent; the interfacial modifier is present in an amount sufficient to assist in adhesion between the polymer components of the blend but less than about 30 weight percent, and the filler is present in an amount sufficient to enhance blend strength and hardness but less than about 40 weight percent.

2. The blend of claim 1, wherein the propylene containing polymer is a semicrystalline polypropylene polymer and the blend has an Izod impact strength at minus 30° C. of at least about 1 ft-lb/in, a flexural modulus of at least about 175 kpsi, a melt flow rate of at least about 16 dg/min at 230° C. and 2.16 kg, and a peel strength of at least about 700 N/m measured in 180 degree peel.

3. The blend of claim 1, wherein the propylene containing polymer is a semicrystalline polypropylene polymer and the blend has an Izod impact strength at minus 30 ° C. of at least about 1.5 ft-lb/in, a flexural modulus of at least about 190 kpsi, the Rockwell R hardness of at least about 70, a shrinkage of no greater than about 8 mil/inch and a peel strength of at least about 900-N/m measured in 180 degree peel.

4. The blend of claim 1, wherein the base component comprises a first propylene containing polymer of polypropylene or a copolymer of propylene and another alpha olefin and a second propylene containing polymer that is functionalized with a hydrophilic monomer.

5. The blend of claim 4, wherein the hydrophilic monomer is maleic anhydride, an acrylate or combinations thereof.

6. The blend of claim 1, wherein the block copolymer comprises two, three or four block components.

7. The polyolefin based composition of claim 1, wherein the block copolymer contains blocks of styrene/(ethylene-butylene)/styrene, styrene/(ethylene-propylene)/styrene, styrene/(ethylene-butylene), styrene/(ethylene-propylene), styrene/butene/styrene, styrene/butene, styrene/(ethylene-propylene)/styrene/(ethylene-propylene), styrene/butadiene or styrene/isoprene.

8. The blend of claim 1, wherein:
    the propylene containing polymer is present in an amount of about 33 to 75 weight percent and about 1 to 9.5 weight percent of the propylene is functionalized;
    the toughening component is present in an amount of about 1 to 25 weight percent;
    the interfacial modifier is present in an amount of about 1 to 30 weight percent; and
    the filler is present in an amount of about 1 to 30 weight percent.

9. The blend of claim 1, wherein:
    the propylene containing polymer is present in an amount of about 33 to 75 weight percent and about 3 to 9.5 weight percent of the propylene is functionalized;
    the toughening component is present in an amount of about 10 to 20 weight percent;
    the interfacial modifier is present in an amount of about 3 to 18 weight percent; and
    the filler is present in an amount of about 8 to 20 weight percent.

10. The blend of claim 4, wherein:
    the propylene containing polymer is present in an amount of about 40 to 60 weight percent;
    the propylene containing polymer that is functionalized with a hydrophilic monomer is present in an amount of 1 to 20 weight percent;
    the interfacial modifier is present in an amount of about 1 to 25 weight percent;
    the toughening component is present in an amount of about 1 to 30 weight percent; and
    the filler is present in an amount of about 1 to 30 weight percent.

11. The blend of claim 4, wherein:
    the propylene containing polymer is present in an amount of about 40 to 60 weight percent;
    the propylene containing polymer that is functionalized with a hydrophilic monomer is present in an amount of 1 to 20 weight percent;
    the interfacial modifier is present in an amount of about 3 to 18 weight percent;
    the toughening component is present in an amount of about 10 to 20 weight percent; and
    the filler is present in an amount of about 8 to 20 weight percent.

12. An article of manufacture comprising a molded polyolefin blend having the composition of claim 1.

13. An article of manufacture comprising a molded polyolefin blend having the composition of claim 4.

14. An automotive product component comprising the article of claim 12.

15. An automotive product component comprising the article of claim 13.

16. A method for making an article of manufacture comprising the step of molding the polyolefin blend of claim 1 into a desired configuration and shape of the article of manufacture.

17. A method for making an article of manufacture comprising the step of molding the polyolefin blend of claim 4 into a desired configuration and shape of the article of manufacture.

18. A method for making a molded automotive product comprising the step of molding the polyolefin blend of claim 1 into a desired configuration and shape of an article of manufacture and utilizing the article of manufacturer as an automotive component.

19. A method for making a molded automotive product comprising the step of molding the polyolefin blend of claim 4 into a desired configuration and shape of an article of manufacture and utilizing the article of manufacturer as an automotive component.

20. A polyolefin blend comprising:

a base component consisting essentially of a propylene containing polymer, a portion of which is functionalized by a hydrophilic moiety of an organic compound that contains one or more hydroxyl groups, an anhydride of a carboxylic acid, acrylamide, or combinations thereof;

a toughening component of polymer comprising one or more of a copolymer of ethylene and an alpha olefin or a terpolymer of ethylene, along with an alpha olefin and a diene, wherein the alpha olefin comprises butene, octene, or both;

an interfacial modifier in the form of an elastomeric block copolymer having at least one block comprising styrene/(ethylene-butene)/styrene, styrene/(ethylene-propylene)/styrene, styrene/(ethylene-butene), styrene/(ethylene-propylene), styrene/butene/styrene, styrene/butene, styrene/butadiene, and styrene/isoprene, and combinations thereof; and a filler;

wherein the functionalized portion of the propylene containing polymer is present in an amount of at least about 0.5%, the toughening agent is present in an amount of about 1 up to 40 weight percent; the interfacial modifier is present in an amount of about 1 to 30 weight percent, and the filler is present in an amount of about 1 to 40 weight percent.

21. A polyolefin blend comprising:

a base component of a polypropylene containing polymer, a portion of which is functionalized by a hydrophilic moiety of an organic compound that contains one or more hydroxyl groups, an acrylamide, or combinations thereof;

a toughening agent component of polymer comprising one or more of a copolymer of ethylene and an alpha olefin or a terpolymer of ethylene, along with an alpha olefin and a diene;

an interfacial modifier in the form of an elastomeric block copolymer;

a filler;

wherein the functionalized portion of the propylene containing polymer is present in an amount sufficient to increase dispersion of the filler within a semicrystalline portion of the blend, the toughening agent is present in an amount sufficient to enhance low temperature impact properties of the blend but less than about 40 weight percent; the interfacial modifier is present in an amount sufficient to assist in adhesion between the polymer components of the blend but less than about 30 weight percent, and the filler is present in an amount sufficient to enhance blend strength and hardness but less than about 40 weight percent.

22. A polyolefin blend comprising:

a base component of a polypropylene containing polymer, a portion of which is functionalized by a hydrophilic moiety of an organic compound that contains one or more hydroxyl groups, anhydrides of carboxylic acids, acrylic acids, acrylamides, acrylates, or combinations thereof;

a toughening agent component of polymer comprising one or more of a copolymer of ethylene and an alpha olefin or a terpolymer of ethylene, along with an alpha olefin and a diene, wherein the alpha olefin comprises butene, octene, or both;

an interfacial modifier in the form of an elastomeric block copolymer;

a filler;

wherein the functionalized portion of the propylene containing polymer is present in an amount of about 1 to 9.5 weight percent to increase dispersion of the filler within a semicrystalline portion of the blend, the toughening agent is present in an amount sufficient to enhance low temperature impact properties of the blend but less than about 40 weight percent; the interfacial modifier is present in an amount sufficient to assist in adhesion between the polymer components of the blend but less than about 30 weight percent, and the filler is present in an amount sufficient to enhance blend strength and hardness but less than about 40 weight percent.

* * * * *

UNITED STATES PATENT AND TRADEMARK OFFICE
CERTIFICATE OF CORRECTION

PATENT NO.   : 6,465,571 B1
DATED        : October 15, 2002
INVENTOR(S)  : Drewniak et al.

It is certified that error appears in the above-identified patent and that said Letters Patent is hereby corrected as shown below:

<u>Title page,</u>
Item [57], ABSTRACT,
Line 5, change "of(A)" to -- of (A) --.
Line 22, change "lend" to -- blend --.

<u>Column 8,</u>
Lines 61 and 66, change "manufacturer" to -- manufacture --.

Signed and Sealed this

Eighteenth Day of February, 2003

JAMES E. ROGAN
*Director of the United States Patent and Trademark Office*